United States Patent
Mailänder et al.

(10) Patent No.: US 10,465,847 B2
(45) Date of Patent: Nov. 5, 2019

(54) SAFETY DEVICE

(71) Applicant: Euchner GmbH & Co. KG, Leinfelden-Echterdingen (DE)

(72) Inventors: Joachim Mailänder, Stuttgart (DE); Sören Albrecht, Stuttgart (DE); Matthias Kraus, Ostfildern (DE); Ilo Grimm, Waldenbuch (DE)

(73) Assignee: Euchner GmbH & Co. KG, Leinfelden-Echterdingen (DE)

( * ) Notice: Subject to any disclaimer, the term of this patent is extended or adjusted under 35 U.S.C. 154(b) by 133 days.

(21) Appl. No.: 15/916,295

(22) Filed: Mar. 9, 2018

(65) Prior Publication Data

US 2018/0292045 A1 Oct. 11, 2018

(30) Foreign Application Priority Data

Apr. 5, 2017 (EP) ..................... 17164994

(51) Int. Cl.

| | |
|---|---|
| *F16P 3/08* | (2006.01) |
| *E05C 3/04* | (2006.01) |
| *H01H 9/28* | (2006.01) |
| *H01H 27/00* | (2006.01) |

(52) U.S. Cl.
CPC .............. *F16P 3/08* (2013.01); *E05C 3/043* (2013.01); *H01H 9/285* (2013.01); *H01H 27/002* (2013.01); *E05Y 2400/324* (2013.01); *E05Y 2900/132* (2013.01); *H01H 2027/005* (2013.01)

(58) Field of Classification Search
None
See application file for complete search history.

(56) References Cited

U.S. PATENT DOCUMENTS 10,119,656 B2 * 11/2018 Kraus ....................... F16P 3/08

OTHER PUBLICATIONS

Wikipedia contributors. (Aug. 25, 2019). Transponder. In Wikipedia, The Free Encyclopedia. Retrieved 23:24, Sep. 16, 2019, from https://en.wikipedia.org/w/index.php?title=Transponder&oldid=912436070 (Year: 2019).*

* cited by examiner

*Primary Examiner* — Daniel J Cavallari
(74) *Attorney, Agent, or Firm* — Michael Soderman

(57) ABSTRACT

A safety device with a safety switch and an actuator that is arranged movably relative to said safety switch. A transponder is arranged in the actuator, and a reading unit is arranged in the safety switch. A locking position of the actuator is controlled by the fact that transponder signals of the transponder are detected in the reading unit. The safety switch has a locking element with an influencing element. The actuator has a sensor coupled with the transponder. In the locking position of the actuator the locking element is insertable into a receptacle of the actuator. This effects the locking of the actuator. This locking is controlled in that the influencing element is only within the range of influence of the sensor when the locking element is inserted into the receptacle. Said sensor generates a sensor signal via which the transponder signals sent by the transponder are modified.

14 Claims, 3 Drawing Sheets

SAFETY DEVICE

CROSS REFERENCE TO RELATED APPLICATIONS

This application claims the priority of EP 17164994.0 filed on 2017 Apr. 5; this application is incorporated by reference herein in its entirety.

BACKGROUND

The invention concerns a safety device.

Such safety devices comprise a safety switch and an actuator arranged movably relative to the safety switch. The safety device thusly embodied is generally used in the sphere of safety technology. An example of such a use is an access security system for a hazardous area to which access can be barred by means of a safety door. In this case, the actuator is typically arranged on the safety door, while the safety switch is arranged on a frame structure delimiting the access.

Known safety switches have an RFID system with a transponder integrated in the actuator and a reading unit integrated in the safety switch. By means of this RFID system, the locking position of the safety door can be controlled. Only when the door is in the locking position is the transponder in the actuator spatially assigned to the reading unit in the safety switch such that transponder signals of the transponder are received by the reading unit.

In addition, the safety door can be secured in its locking position by means of the safety device. For this purpose, the safety switch typically has a locking element in the form of a locking bolt which, when the safety door is in the locking position, can be moved into a receptacle, in particular a recess in the actuator, thus effecting locking of the safety door.

A problem in such safety devices can be that the actuator can be brought into a position in such a manner that, while the RFID system still signals a locking position of the safety door, the locking bolt is, however, released from the receptacle of the actuator. The safety switch then reports a locked state of the safety door despite the fact that this does not correspond to the actual conditions.

SUMMARY

The invention concerns a safety device (1) with a safety switch (2) and an actuator (3) that is arranged movably relative to said safety switch. A transponder (5) is arranged in the actuator (3), and a reading unit (4) is arranged in the safety switch (2). A locking position of the actuator (3) is controlled by the fact that transponder signals of the transponder (5) are detected in the reading unit (4). The safety switch (2) has a locking element (6) with an influencing element (12). The actuator (3) has a sensor (11) coupled with the transponder (5). In the locking position of the actuator (3) the locking element (12) is insertable into a receptacle (7) of the actuator (3). This effects the locking of the actuator (3). This locking is controlled by the fact that the influencing element (12) is only within the range of influence of the sensor (11) when the locking element (6) is inserted into the receptacle (7). Said sensor (11) generates a sensor signal by means of which the transponder signals sent by the transponder (5) are modified. The modified transponder signals are detected in the reading unit (4).

DETAILED DESCRIPTION

The invention is based on the problem of providing a safety device of the aforementioned type that has a high level of functional reliability with low design expense.

For resolving this problem, the features of claim 1 are provided. Advantageous embodiments and useful further embodiments are described in the dependent claims.

The invention concerns a safety device having a safety switch and an actuator arranged movably relative to the safety switch. In the actuator, a transponder is arranged, and in the safety switch, a reading unit is arranged. A locking position of the actuator is controlled by transponder signals of the transponder being detected in the reading unit. The safety switch has a locking element with an influencing element. The actuator has a sensor coupled with the transponder. In the locking position of the actuator, the locking element can be inserted into a receptacle of the actuator, thereby effecting locking of the actuator. This locked state is controlled by the fact that the influencing element is only in the influencing range of the sensor when the locking element is inserted into the receptacle. The sensor generates a sensor signal by means of which the transponder signals sent by the transponder are modified. The modified transponder signals are detected in the reading unit.

The safety device pursuant to the invention has a high level of functional reliability. By means of the reading unit integrated in the safety switch and the transponder integrated in the actuator it is possible to monitor whether the actuator is in its locking position, because transponder signals of the transponder are received and read by the reading unit in this locking position. In addition, locking is realized by the safety device in such a manner that when the actuator is in the locking position, the locking element of the safety switch is inserted into a receptacle of the actuator.

Pursuant to the invention, this locking is controlled and monitored by means of the influencing element integrated in the locking element and by the sensor integrated in the actuator, thereby making the safety device tamper-proof. If the sensor registers that no locking exists, the safety switch can generate a corresponding output signal so that an unsafe, hazardous condition is prevented.

An essential advantage of the invention consists of the fact that the sensor is coupled with the transponder in such a manner that the sensor influences the transponder signals in a characteristic manner. Thus, the RFID system can be used not only for controlling the locking position of the actuator. Instead, said system can also be used to monitor the locking, thereby allowing the expense for monitoring the locking to be kept low.

An essential advantage consists of the fact that the sensor and the influencing element form a contactlessly operating unit so that this unit does not experience any wear.

Here it is particularly advantageous that the sensor in the actuator is embodied such that said sensor either does not need an electric voltage supply, or that the voltage can be supplied via the resonant circuit of the transponder. It is further advantageous that the influencing element is a passive element such that it does not need any electrical connections. Thus, complex electrical supply lines from the safety switch to the influencing element, which is located in the locking element that is movable relative to the safety switch, are eliminated.

Thus, the safety device thus has a very compact and robust design.

Particularly advantageously, the transponder has at least one transponder chip and one transponder coil as integral parts of a transponder resonant circuit. By means of the transponder, encoded transponder signals are generated.

Pursuant to a first variant, the sensor is an integral part of the transponder resonant circuit. The resonance frequency of the transponder resonant circuit is modified by means of the influencing element that is introduced into the sensor's range of influence.

The sensor for monitoring the locking then functions by means of the reading unit receiving transponder signals of the transponder on a first carrier frequency if the locking element is not inserted into the receptacle of the actuator. On a second carrier frequency, the reading unit receives transponder signals of the transponder if the locking element is inserted into the receptacle of the actuator and the resonance frequency of the transponder resonant circuit is modified by the influencing element.

The influencing of the transponder resonant circuit effected in such a manner allows simple and reliable monitoring of the locking of the actuator.

In this case, the sensor can be embodied by a coil, and the influencing element of the locking element can be embodied by a magnetic material.

For example, the coil can have a ferrite core that is saturated by the influencing element consisting of magnetic material, when the locking element is inserted into the receptacle and is thus within the range of influence of the coil.

The coil thus forms a very simple sensor that does not need its own voltage supply. The influencing element can simply be embodied by the locking element itself consisting of a magnetic material, or by the fact that a corresponding magnetic material is arranged within the locking element. In each case, the influencing element forms a passive element such that no electrical connections need to be provided for said element.

Alternatively, the sensor can be embodied by a capacitor. In this case, the influencing element consists of a dielectric material that modifies the capacity of the capacitor when the influencing element is in the influencing range of the sensor.

Pursuant to a second variant, the transponder has a transponder chip having a logic unit. The sensor is connected to an input of the transponder chip. Via the sensor influenced by the influencing element, said transponder chip generates a sensor signal by means of which a switch-over of codes that are transmitted to the reading unit via the transponder takes place in the transponder chip.

By distinguishing the codes sent by the transponder, the reading unit can simply and reliably detect whether or not a locked state exists.

Particularly advantageously, the sensor generates a binary output signal that is fed to the transponder. Depending on whether the influencing element is in the influencing range of the sensor, the latter's output signal assumes a defined switching state, based on which the selection of the corresponding code is made in the transponder chip.

Particularly advantageously, the sensor is a proximity switch. In principle, the sensor can be embodied as an optical or capacitive proximity switch, and advantageously, as an inductive proximity switch. The associated influencing element has corresponding material characteristics so that the proximity switch changes its output signal in a defined manner as the influencing element approaches or moves away.

Pursuant to a third variant, the transponder has two transponder chips, each of which is connected to the sensor, with different codes being stored in the transponder chips. If the influencing element of the locking element is arranged outside the range of influence of the sensor, a first transponder chip is selected by means of the sensor so that the codes of the first transponder are transmitted to the reading unit as transponder signals. If the influencing element of the locking element is arranged within the range of influence of the sensor, the second transponder chip is selected by means of the sensor so that the codes of the second transponder chip are transmitted to the reading unit as transponder signals.

Advantageously, in this case the sensor is a switching element generating a binary switching signal, with one of the transponder chips being selected depending on the switching states of the switching signal.

This switching element can be embodied, for example, by a reed contact. In this case, the associated influencing element is embodied as a magnet. What is advantageous here is the fact that the reed contact does not need an electric voltage supply. Alternatively, the switching element can be embodied by a capacitive MEMS sensor or by a Hall sensor. In either case, voltage is supplied via the transponder resonant circuit.

BRIEF DESCRIPTION OF THE DRAWINGS

Below, the invention is explained based on the drawings. They show the following.

DETAILED DESCRIPTION OF THE PREFERRED EMBODIMENTS

Figure 1:
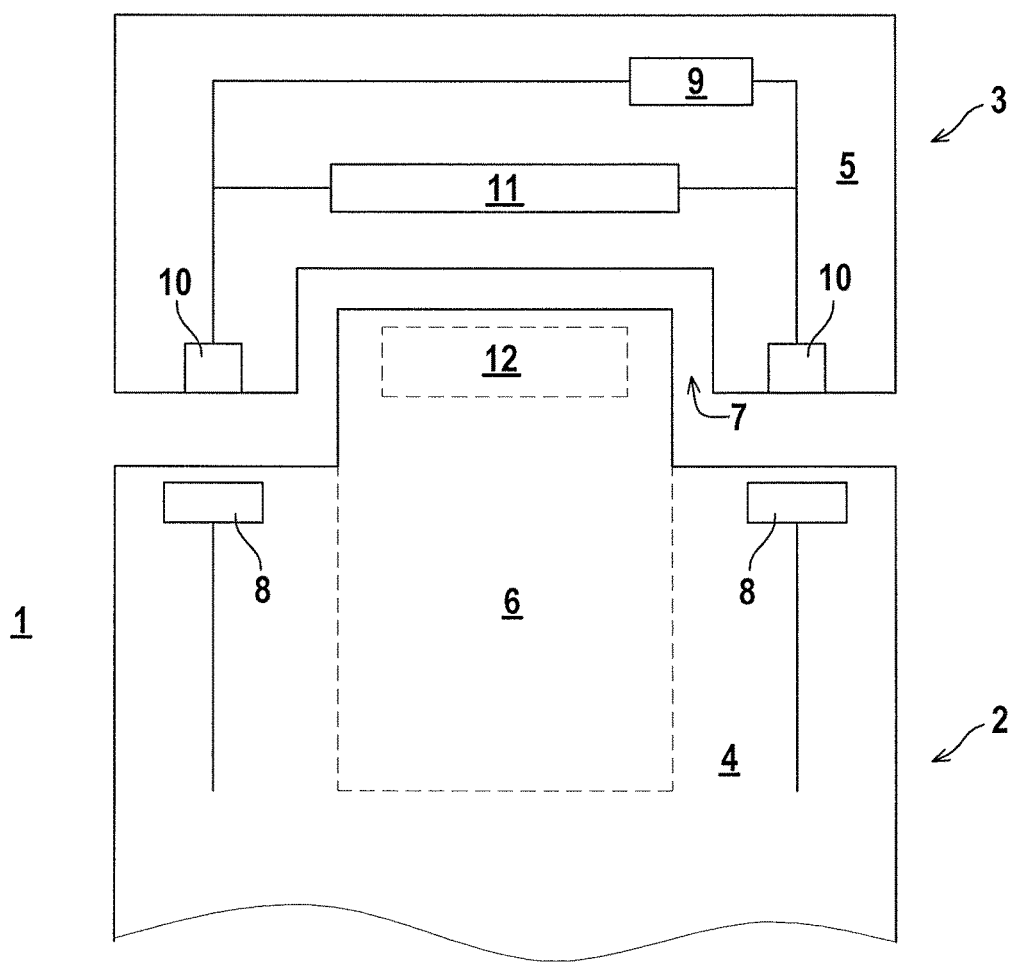
FIG. 1: First exemplary embodiment of the safety device pursuant to the invention.
Figure 2:
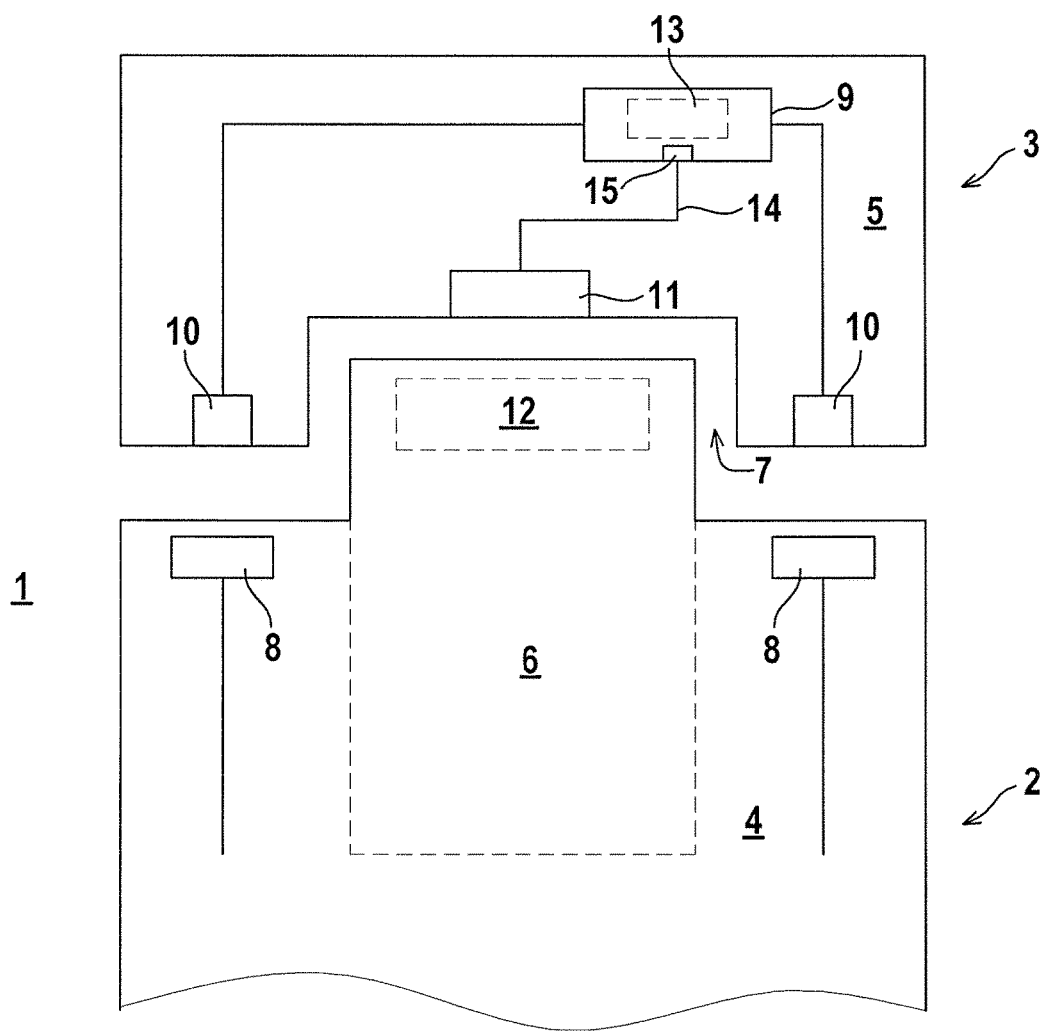
FIG. 2: Second exemplary embodiment of the safety device pursuant to the invention.
Figure 3:
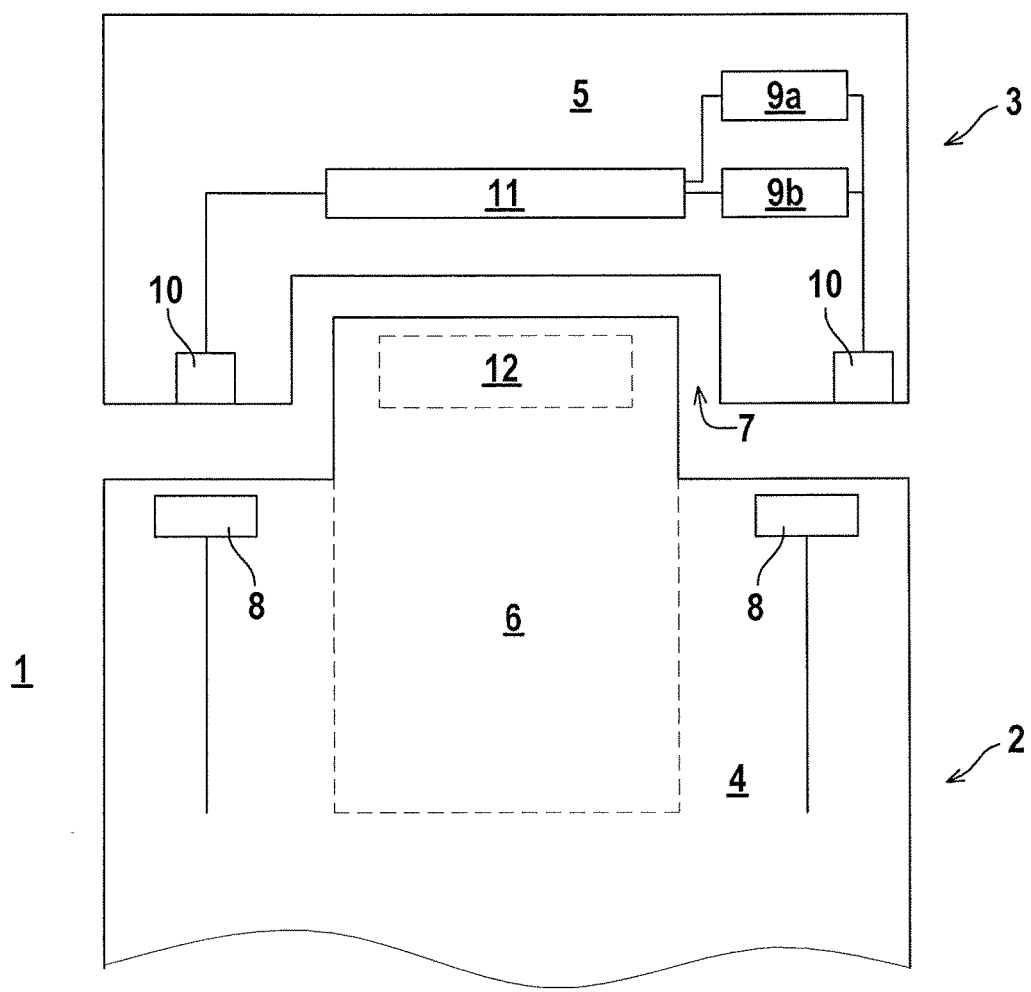
FIG. 3: Third exemplary embodiment of the safety device pursuant to the invention.

FIGS. 1 to 3 show different embodiments of the safety device 1 pursuant to the invention, having a safety switch 2, and an actuator 3 that is movable relative to the safety switch 2.

This safety device 1 is used, for example, to secure a safety door used as an access to a hazardous area. The actuator 3 can then be arranged on the safety door and the safety switch 2 can be arranged on a frame delimiting the door opening.

On the one hand, the safety device 1 is used to control the locked position of the safety door, with the safety door being in its locked position when the actuator 3 is in a corresponding locking position on the safety switch 2. In addition, the safety device 1 is used to effect locking of the safety door in its locked position.

The exemplary embodiments pursuant to FIGS. 1 to 3 show the actuator 3 in in its locking position in which the actuator 3 is situated opposite the safety switch 2. This locking position is monitored by means of an RFID system generally having a reading unit 4 arranged in the safety switch 2, as well as a transponder 5 arranged in the actuator 3.

The safety switch 2 has a locking element 6 in the form of a locking bolt. Corresponding to this, the actuator 3 has a receptacle 7 in the form of a recess. The locking element 6 can be moved by means of a drive (not shown), in the axial direction of the safety switch 2, between a release position and a blocking position. In the release position, the locking element 6 is completely retracted into the safety switch 2. If the actuator 3 is in its locking position, the locking element 6 can, as shown in FIGS. 1 to 3, be extended into the blocking position so that the locking element 6 is inserted into receptacle 7 of the actuator 3, thus effecting the locking.

The reading unit 4 of the RFID system has a reading coil 8 in the area of the end face of the safety switch 2 that is oriented towards the actuator 3. The reading coil 8 is connected to an analyzing unit (not shown) as a further integral part of the reading unit 4.

The transponder 5 of the actuator 3 pursuant to FIG. 1 has a transponder chip 9, and a transponder coil 10 that is an integral part of a resonant circuit of a transponder. The transponder's resonant circuit further has a capacitor (not shown). The transponder coil 10 is located in the area of the end face of the actuator 3 that is oriented towards safety switch 2.

In the locking position of the actuator 3, the latter is located opposite the safety switch 2. Thus, the reading unit 4 of the safety switch 2 can receive encoded transponder signals of the transponder 5, which allows detecting the locking position of the actuator 3.

Pursuant to the invention, in the transponder's resonant circuit a sensor 11 is provided by means of which the locking effected by the locking element 6 can be monitored. An influencing element 12 is associated with said sensor 11 in the locking element 6. The sensor 11 and the influencing element 12 form a unit that operates contact-free.

In the embodiment pursuant to FIG. 1, the sensor 11 is formed by a coil that preferably has a ferrite core. The sensor 11 embodied as a coil does not need an electric voltage supply. The influencing element 12 is embodied by a magnetic material. Here, the influencing element 12 can be an integral part of the locking element 6, or it can be integrated in the locking element 6 as a separate element. In each case, this influencing element 12 does not need any electrical connections, i.e. no wires need to be routed from the stationary safety switch 2 to the movable locking element 6.

If the locking element 6 with the influencing element 12 is in its release position, the influencing element 12 is outside the range of influence of the sensor 11 so that the resonance frequency of the transponder resonant circuit is not influenced by said sensor. In this case, the reading unit 4 receives the signals of the transponder 5 on a first carrier frequency, which signals include a code specified by the transponder chip 9.

If the locking element 6 is then moved into its blocking position, the locking element 6 is located in the receptacle 7 of the actuator 3. Thus, the influencing element 12 is within the range of influence of the sensor 11, i.e. of the coil. The ferrite core of the coil is saturated by the magnetic material of the influencing element 12, which modifies the resonance frequency of the transponder's resonance circuit. As a consequence, the reading unit 4 no longer detects the transponder signals on the first carrier frequency. Therefore, the reading unit 4 switches over to another carrier frequency that is adapted to the modified resonance frequency, and can then detect the transponder signals of the transponder 5. Due to this switch-over, the locking by the locking element 6 is reliably detected and monitored.

Alternatively, the sensor 11 can also consist of a capacitor, as this can also be used to modify the resonance frequency of the transponder's resonance circuit. The influencing element 12 then consists of a dielectric or a metallically conductive material.

FIG. 2 shows a second exemplary embodiment of the safety device pursuant to the invention. This safety device 1 is distinguished from the embodiment pursuant to FIG. 1 only with regard to the embodiment of the sensor 11 and its connection to the transponder 5.

In the exemplary embodiment pursuant to FIG. 2, in contrast to the embodiment from FIG. 1, the transponder chip 9 has a logic unit 13. In principle, the transponder chip 9 can then be embodied by a microprocessor or similar. In the present case, the sensor 11 is embodied as a binarily switching sensor 11, in particular, as a proximity switch, with particularly advantageously an inductive proximity switch being used. Adapted to this, the influencing element 12 consists of a metallic material [compatible] with the proximity switch. The sensor 11 is connected to an input 15 of the transponder chip 9 via a feed wire. In principle, a capacitive or an optical proximity switch can also be used.

If the locking element 6 is in its release position, the influencing element 12 is outside the range of influence of the proximity switch so that the latter's output signal assumes a first switching state. The transponder chip 9 then generates a first code that is transmitted as a transponder signal to the reading unit 4 by means of the transponder coil 10. If the locking element 6 is inserted into the locking position, the influencing element 12 is within the range of influence of the sensor 11, i.e. of the proximity switch, so that the switching state of the sensor 11 changes. This change in switching state will be read into the transponder chip 9 via the input 15, causing said chip to modify, i.e. to switch over, the code that is sent to the reading unit 4 via the transponder coil 10. This code switch-over is then detected in the reading unit 4, and as a result the locking is reliably detected and monitored.

FIG. 3 shows a third exemplary embodiment of the safety device 1 pursuant to the invention. This safety device 1 also is distinguished from the embodiment pursuant to FIG. 1 only with regard to the design of the sensor 11 and its connection to the transponder 5.

In the embodiment of FIG. 3, the sensor 11 is a switching element, with a reed contact being used in the present case. In principle, the sensor 11 can also be designed as a Hall sensor or an MEMS sensor.

Adapted to the embodiment of the sensor 11 in the form of a reed contact, the influencing element 12 consists of a magnet.

In the present case, the transponder 5 has two transponder chips 9a, 9b, with a first code being specifiable by means of the first transponder chip 9a, and a second code being specifiable by means of the second transponder chip 9b for the purpose of transmitting encoded transponder signals. The sensor 11 is integrated in the transponder's resonance circuit and connected to the two transponder chips 9a, 9b.

If the locking element 6 is in its release position, the influencing element 12 is outside the range of influence of the reed contact embodying the sensor 11. The reed contact then activates the first transponder chip 9a so that its code encodes the transponder signal that is then registered in the reading unit 4. If the locking element 6 is in its locking position, the influencing element 12 is within the range of influence of the reed contact so that its switching signal is modified, thus activating the second transponder chip 9b so that its code encodes the transponder signal that is then registered in the reading unit 4. This code switch-over allows the locking to be reliably detected and monitored.

LIST OF REFERENCE NUMERALS (1) Safety device
(2) Safety switch
(3) Actuator
(4) Reading unit
(5) Transponder (6) Locking element
(7) Receptacle
(8) Reading coil
(9) Transponder chip
(9a) First transponder chip
(9b) Second transponder chip
(10) Transponder coil
(11) Sensor
(12) Influencing element
(13) Logic unit
(14) Feed wire
(15) Input

The invention claimed is:

1. A safety device (1) having a safety switch (2), and an actuator (3) that is arranged movably relative to said switch, with a transponder (5) being arranged in the actuator (3) and a reading unit (4) being arranged in the safety switch (2), wherein a locking position of the actuator (3) is controlled by the fact that transponder signals of the transponder (5) are detected in the reading unit (4), characterized in that the safety switch (2) has a locking element (6) having an influencing element (12), and that the actuator (3) has a sensor (11) coupled with the transponder (5), and that in the locking position of the actuator (3) the locking element (6) is insertable into a receptacle (7) of the actuator (3), whereby locking of the actuator (3) is effected, and that this locking is controlled by the fact that the influencing element (12) is only within the range of influence of the sensor (11) when the locking element (6) is inserted into the receptacle (7), so that said sensor generates a sensor signal by means of which the transponder signals sent by the transponder (5) are modified, with the modified transponder signals being detected in the reading unit (4).

2. The safety device (1) pursuant to claim 1, characterized in that the transponder (5) has at least one transponder chip (9) and a transponder coil (10) as an integral part of a resonance circuit of a transponder, with encoded transponder signals being generated by the transponder (5).

3. The safety device (1) pursuant to claim 2, characterized in that the sensor (11) is an integral part of the transponder's resonance circuit, with the resonance frequency of the resonant circuit of the transponder being modified by means of the fact that influencing element (12) is brought into the range of influence of the sensor (11).

4. The safety device (1) pursuant to claim 3, characterized in that the reading unit (4) receives transponder signals of the transponder (5) on a first carrier frequency when the locking element (6) is not inserted into the receptacle (7) of the actuator (3), and that the reading unit (4) of the transponder (5) receives transponder signals of the transponder (5) on a second carrier frequency when the locking element (6) is inserted into the receptacle (7) of the actuator (3) and the resonance frequency of the resonance circuit of the transponder is modified by the influencing element (12).

5. The safety device (1) pursuant to claim 4, characterized in that the sensor (11) is embodied by a coil and the influencing element (12) of the locking element (6) is made of a magnetic material.

6. The safety device (1) pursuant to claim 5, characterized in that the sensor (11) is embodied by a capacitor.

7. Safety device (1) pursuant to claim 2, characterized in that the transponder (5) has a transponder chip (9) having a logic unit (13), and that the sensor (11) is connected to an input (15) of the transponder chip (9), wherein, with the sensor (11) being influenced by the influencing element (12), said sensor generates a sensor signal by means of which codes being transmitted to the reading unit (4) via the transponder (5) are switched over in the transponder chip (9).

8. The safety device (1) pursuant to claim 7, characterized in that the sensor (11) is a proximity switch.

9. The safety device (1) pursuant to claim 2, characterized in that the transponder (5) has two transponder chips (9a, 9b) each of which is connected to the sensor (11), with different codes being stored in the transponder chips (9a, 9b), and that, if the influencing element (12) of the locking element (6) is arranged outside the range of influence of the sensor (11), a first transponder chip (9a) is selected by means of the sensor (11) so that said transponder chip's codes are transmitted to the reading unit (4) as transponder signals, and that, if the influencing element (12) of the locking element (6) is arranged within the range of influence of the sensor (11), the second transponder chip (9b) is selected by means of the sensor (11) so that the codes of said transponder chip are transmitted to the reading unit (4) as transponder signals.

10. The safety device (1) pursuant to claim 9, characterized in that the sensor (11) is a switching element that generates a binary switching signal, with one of the transponder chips (9a, 9b) being selected depending on the switching states of the switching signal.

11. The safety device (1) pursuant to claim 10, characterized in that the switching element is a reed contact, an MEMS switch, or a Hall sensor.

12. The safety device (1) pursuant to claim 1, characterized in that the sensor (11) and the influencing element (12) form a unit that works contact-free.

13. The safety device (1) pursuant to claim 1, characterized in that the influencing element (12) is a passive element without electrical connections.

14. The safety device (1) pursuant to claim 1, characterized in that the locking element (6) is arranged movably by means of a drive in the safety switch (2).

* * * * *